(12) United States Patent
Mazza et al.

(10) Patent No.: US 12,523,049 B2
(45) Date of Patent: Jan. 13, 2026

(54) MOVABLE BASE FOR USE WITH A SCAFFOLD

(71) Applicant: Aqua Conscience Holdings LLC, Lancaster, PA (US)

(72) Inventors: Marcus A. Mazza, Lancaster, PA (US); Brian M. Kelly, Lancaster, PA (US); Chad Phillips, Lancaster, PA (US); Bartley J. Eckhardt, Lancaster, PA (US); Bret W. Johnson, Lancaster, PA (US); Jorge Torres, Lancaster, PA (US); Christopher C. Fogarty, Lancaster, PA (US); Christopher Roche, Lancaster, PA (US)

(73) Assignee: Aqua Conscience Holdings LLC, Lancaster, PA (US)

( * ) Notice: Subject to any disclaimer, the term of this patent is extended or adjusted under 35 U.S.C. 154(b) by 631 days.

(21) Appl. No.: 17/932,696

(22) Filed: Sep. 16, 2022

(65) Prior Publication Data

US 2024/0093514 A1    Mar. 21, 2024

(51) Int. Cl.
*E04G 1/24*  (2006.01)
*B62B 5/00*  (2006.01)
*E06C 1/397* (2006.01)

(52) U.S. Cl.
CPC .............. *E04G 1/24* (2013.01); *B62B 5/0083* (2013.01); *E06C 1/397* (2013.01); *E04G 2001/242* (2013.01)

(58) Field of Classification Search
CPC ....... E04G 1/24; E04G 2001/242; B66F 5/00; E06C 1/397; B60B 33/06; B62B 5/0083
See application file for complete search history.

(56) References Cited

U.S. PATENT DOCUMENTS

| | | | | |
|---|---|---|---|---|
| 4,269,394 | A * | 5/1981 | Gray | B66F 5/00 254/134 |
| 5,791,434 | A * | 8/1998 | Swiderski | E06C 1/397 182/15 |
| 5,941,341 | A * | 8/1999 | Gillis | E06C 1/39 182/15 |
| 6,026,931 | A * | 2/2000 | Swiderski | E06C 1/397 182/15 |
| 6,039,147 | A | 3/2000 | Gillis et al. | |
| 6,179,087 | B1 * | 1/2001 | Moffat | E06C 1/397 182/103 |

(Continued)

OTHER PUBLICATIONS

Office Action for Canadian Patent Application No. 3,212,230 issued on Mar. 4, 2025.

*Primary Examiner* — Andrew J Triggs
(74) *Attorney, Agent, or Firm* — Potomac Law Group, PLLC

(57) ABSTRACT

A base for use with scaffolding. The base includes side support members and cross members. The side support members have scaffold receiving members provided at ends thereof. The cross members extend between the side support members and are rotatably mounted to the side support members. Wheels are mounted to the cross members. As the cross members are rotated from a first position to a second position, the wheels are moved from an initial position in which the wheels are spaced from a ground or floor surface to a second position in which the wheels are positioned in engagement with the ground or floor surface.

19 Claims, 9 Drawing Sheets

(56) References Cited

U.S. PATENT DOCUMENTS

| | | | | |
|---|---|---|---|---|
| 6,209,681 B1* | 4/2001 | DiSario | ............ | E06C 1/397 |
| | | | | 182/20 |
| 6,305,496 B1* | 10/2001 | Bieszczad | ............ | E06C 1/39 |
| | | | | 182/15 |
| 6,523,640 B1* | 2/2003 | Young | ............ | E06C 1/39 |
| | | | | 182/15 |
| 11,760,430 B2* | 9/2023 | Hahn | ............ | B66F 7/0608 |
| | | | | 254/9 C |
| 2008/0093166 A1* | 4/2008 | Frolik | ............ | E06C 7/181 |
| | | | | 182/108 |
| 2008/0217103 A1* | 9/2008 | Pucek | ............ | E06C 1/39 |
| | | | | 182/15 |
| 2013/0233646 A1* | 9/2013 | Boysaw | ............ | E04G 1/24 |
| | | | | 182/115 |
| 2017/0356198 A1 | 12/2017 | Rowsome | | |
| 2024/0093514 A1* | 3/2024 | Mazza | ............ | E04G 1/34 |

* cited by examiner

MOVABLE BASE FOR USE WITH A SCAFFOLD

FIELD OF THE INVENTION

The present invention relates generally to a movable and stable scaffold. More particularly, the invention relates to a base for a scaffold, such as, but not limited to a Baker or Perry type scaffold, which allows the scaffold to be moved and which provides stability to the scaffold when in use.

BACKGROUND OF THE INVENTION

Baker scaffolds allow workers to reach, and work, at heights outside of their normal reach. Baker scaffolding has various standard dimensions, materials, and approaches. Scaffolds, and scaffolding as interchangeably used herein, is typically assembled and worked on, and is then disassembled to move to a new location.

More recently, approaches to movable scaffolding have been considered. Some of such approaches include motorized movement of scaffolds, for example. However, such movable scaffolds suffer from several deficiencies that make them less safe and less practical.

It is therefore desirable to manufacture and use a movable scaffold or scaffold base that addresses some of these deficiencies.

It would be beneficial to provide a scaffold or a base for a scaffold which provides for a safe and easy method of moving the scaffold, while providing for increased stability of the scaffold when in use and preventing the scaffold from rolling automatically without having to manually apply each caster lock.

SUMMARY OF THE INVENTION

An object is to provide a scaffold or base for a scaffold which allows the scaffold to be safely and easily moved.

An object is to provide a scaffold or base for a scaffold when properly positioned prevents the unwanted movement of the scaffold.

An object is to provide a scaffold or base for a scaffold which is easily movable when desired, but which provides a failsafe braking mechanism to prevent any unwanted or uncontrolled movement of the scaffold or base for a scaffold.

An object is to provide a scaffold or base for a scaffold which has increased stability when the scaffold or base for a scaffold is in a non-movable position.

An embodiment is directed to a base for use with scaffolding. The base includes side support members and cross members. The side support members have scaffold receiving members provided at ends thereof. The cross members extend between the side support members and are rotatably mounted to the side support members. Wheels are mounted to the cross members. As the cross members are rotated from a first position to a second position, the wheels are moved from an initial position in which the wheels are spaced from a ground or floor surface to a second position in which the wheels are positioned in engagement with the ground or floor surface.

In various embodiments, an engagement member extends from an end cross member of the cross members in a direction away from a second cross member of the cross members. The engagement member is attached to the end cross member wherein the movement of the engagement member causes the end cross member to rotate.

In various embodiments, a first connecting shaft mounting bracket is provided on the end cross member, the first connecting shaft mounting bracket is provided proximate to and in line with the engagement member. A connecting shaft extends from the first connecting shaft mounting bracket in a direction toward the second cross member, the connecting shaft is pivotally mounted to the first connecting shaft mounting bracket. A second connecting shaft mounting bracket is provided on the second cross member, the second connecting shaft mounting bracket is provided in line with the first connecting shaft mounting bracket. The connecting shaft extends from the second connecting shaft mounting bracket in a direction toward the end cross member, the connecting shaft is pivotally mounted to the second connecting shaft mounting bracket in a manner which allows the connecting shaft to adjust the mechanism for transport, or position adjustment, utilizing a single easy ergonomic motion.

In various embodiments, the cross members have cylindrical configurations and are mounted in openings of the side support members. Wheel brackets are mounted to and extend from the cross members. The wheel brackets include the wheels which are offset from the longitudinal axes of the cross members.

In various embodiments, the side support members have outriggers movably attached thereto. The outriggers have extension arms which have support member connections at one end and adjustable feet provided at the opposite end. The outriggers pivot about the side support members between a retracted position and an extended position.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
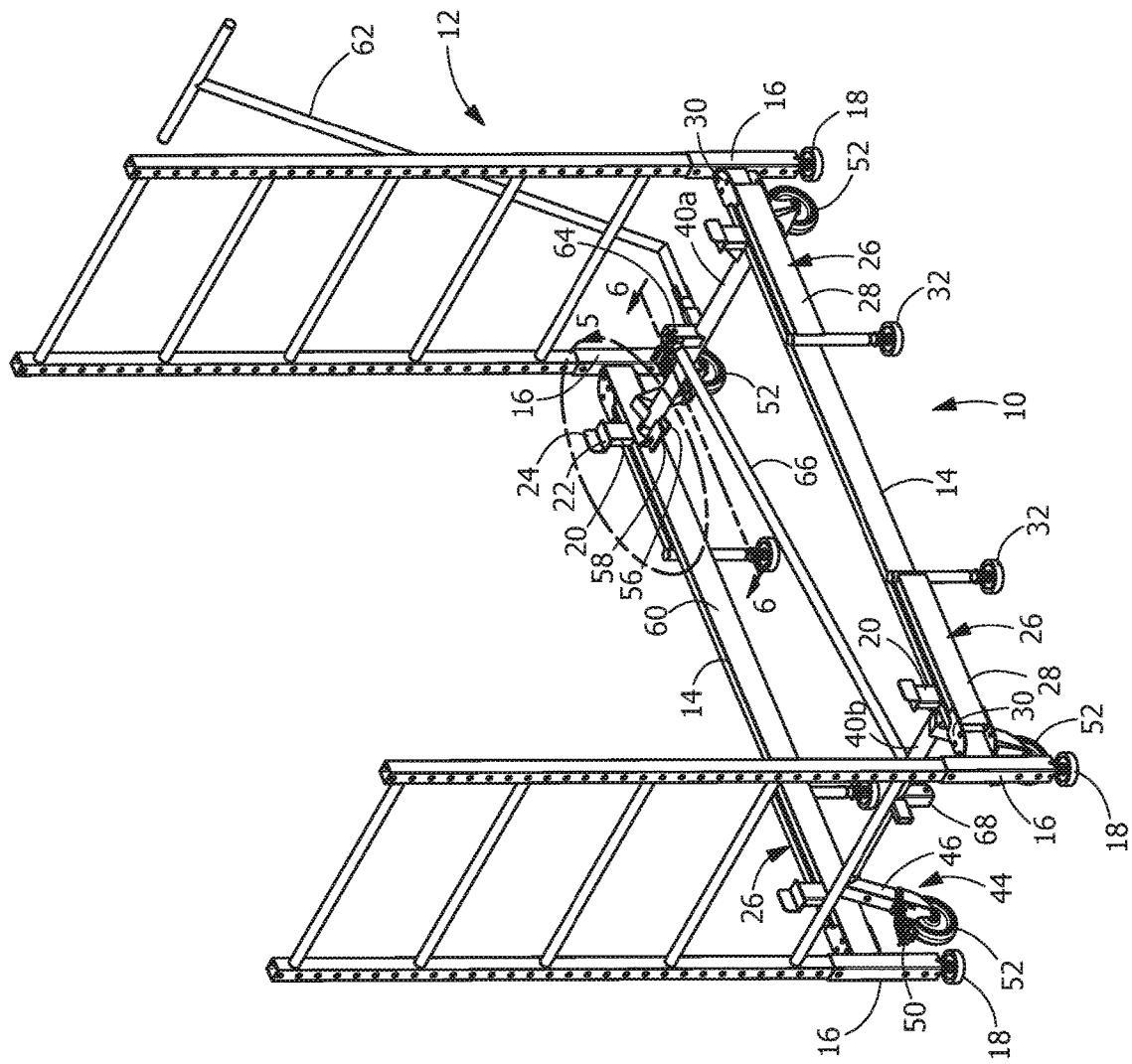
FIG. 1 is a perspective view of an illustrative embodiment of a scaffold base of the present invention with a scaffold attached thereto, the scaffold base is shown in a non-movable position, with wheels retracted or removed from ground or floor surface.
Figure 2:
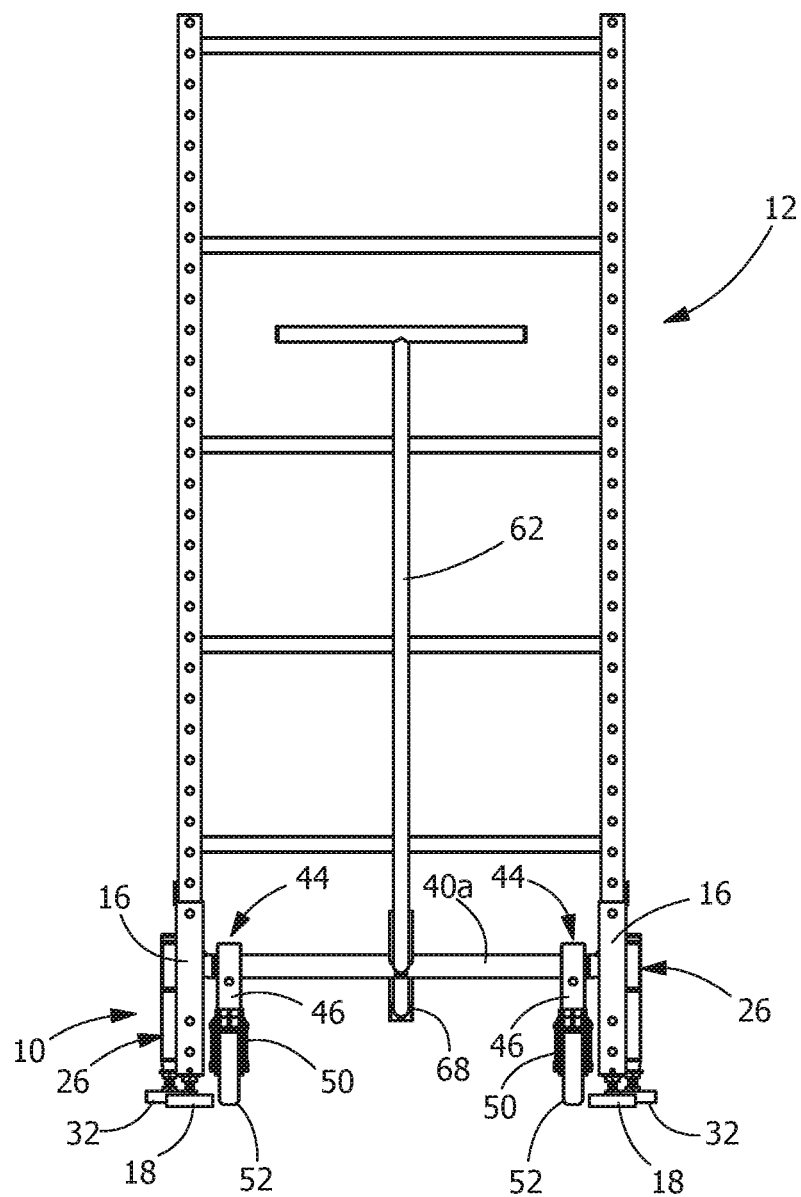
FIG. 2 is a front view of the scaffold base and the scaffold of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

In the illustrative embodiment of FIGS. 1 through 6, a base 10 for use with a scaffold or scaffolding 12 is shown. Although the base 10 is shown as a separate member, the base 10 may be integral with the scaffold 12 in other illustrative embodiments.

The base 10 has two side support members 14 which are spaced from each other and extend essentially parallel to each other. The support members 14 have scaffold receiving members 16 provided at ends thereof. In the embodiment shown, the scaffold receiving members 16 are hollow square tubes which receiving portions of the scaffold 12 thereon. However, other configurations of the scaffold receiving members 16 may be used. Adjustable feet 18 are provided at the ends of the scaffold receiving members 16.

Riser members 20 extend from the side support members 14. The riser members are spaced periodically along upper surfaces of the side support members 14. The riser members 20 extend from the upper surfaces in a direction away from lower surfaces of the side support members 14. The riser members 20 have essentially flat end surfaces 22 which extend essentially parallel to the upper surfaces of the side support members 14. Retention projections 24 may extend from the end surfaces 22. The retention projections 24 extend essentially perpendicular to the end surfaces 22.

Figure 3:
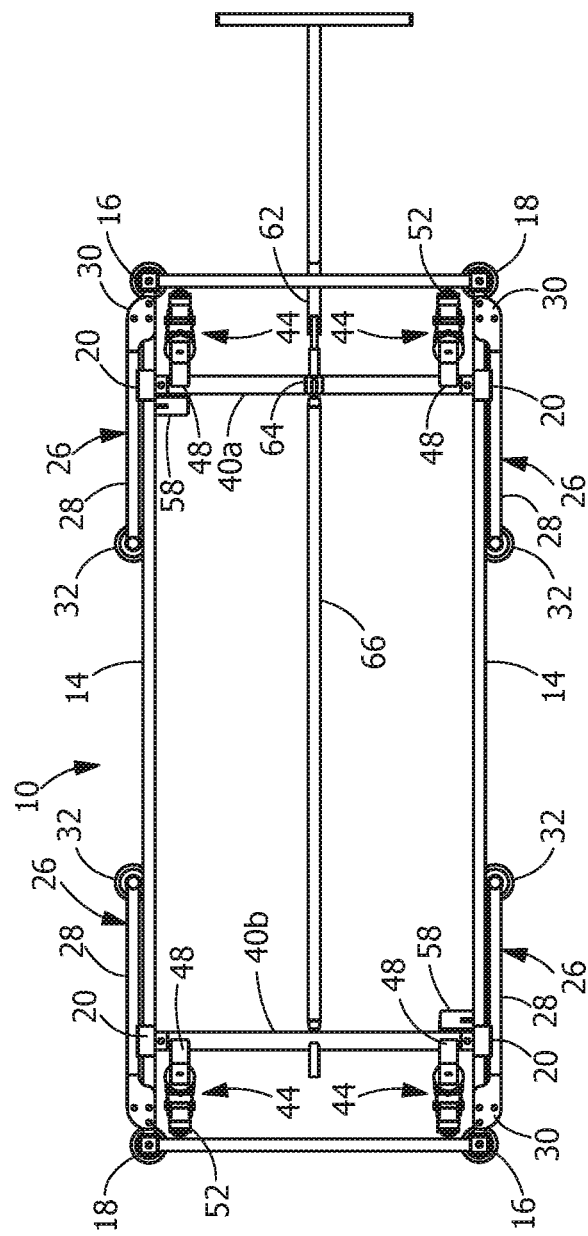
FIG. 3 is a top view of the scaffold base of FIG. 1.
Figure 4:
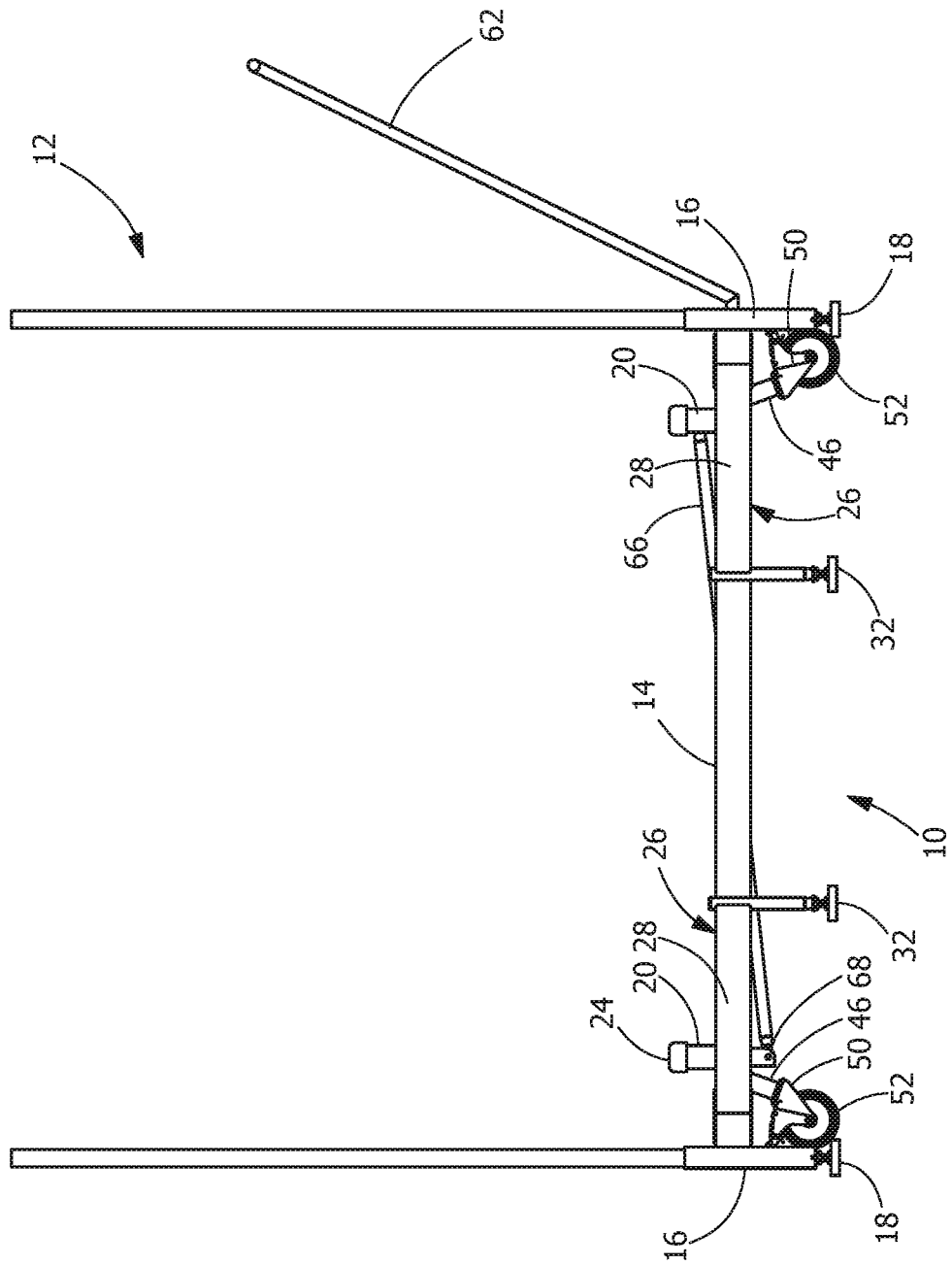
FIG. 4 is a side view of the scaffold base and the scaffold of FIG. 1 with the wheels shown in the retracted position and outriggers shown in an initial or non-extended position.
Figure 5:
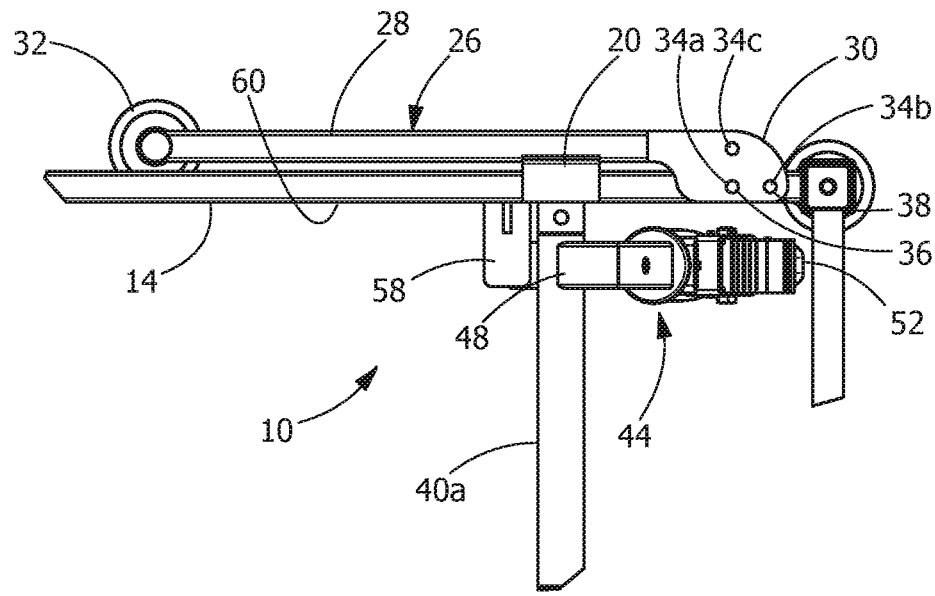
FIG. 5 is an enlarged view of the section indicated by the outline marked 5 in FIG. 1.
Figure 9:
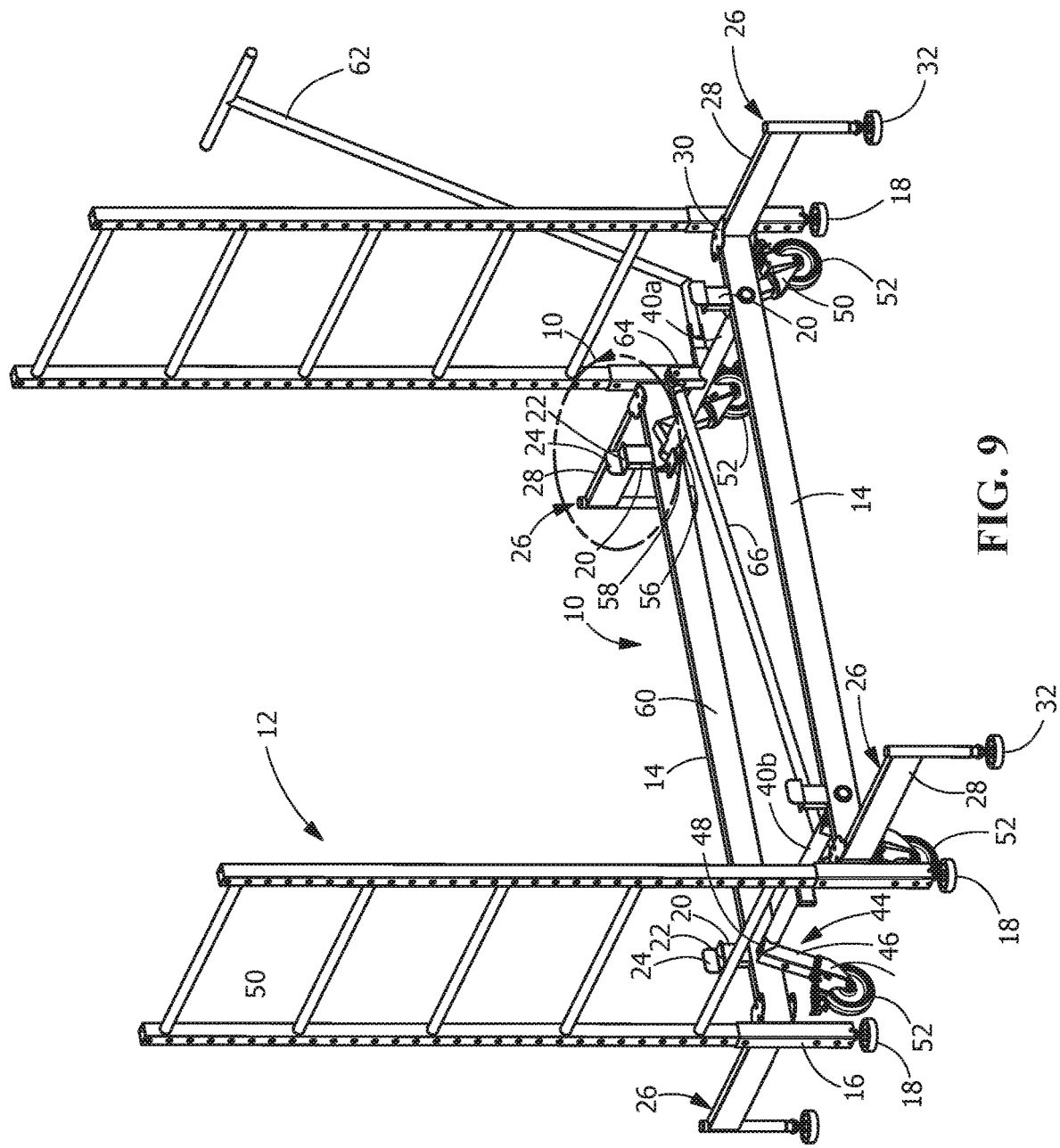
FIG. 9 is a perspective view of the illustrative embodiment of the scaffold base of the present invention with the scaffold base shown in the non-movable position, with wheels retracted or removed from ground or floor surface and the outriggers shown in an extended position.

As shown in FIGS. 1, 3 and 5, the side support members 14 have movable supports or outriggers 26 movably attached thereto. The outriggers 26 have extension arms 28 which have support member connections 30 at one end and adjustable feet 32 provided at the opposite end. In the illustrative embodiment shown in FIGS. 5 and 10, each of the support member connections 30 has three openings 34a, 34b, 34c which extend therethrough. Openings 34a are aligned with first openings (not shown) in the side support members 14, wherein mechanical fasteners 36, such as, but not limited to pins or nuts/bolts, are positioned therein. The mechanical fasteners 36 allow the support member connections 30 and the outriggers 26 to be pivoted about the mechanical fasteners 36 and the side support members 14, as will be more fully described. The openings 34b and 34c are aligned with second openings (not shown) in the side support members 14, wherein mechanical fasteners 38, such as, but not limited to pins or nuts/bolts, are positioned therein. The mechanical fasteners 38 allow the support member connections 30 and the outriggers 26 to be secured in a first, retracted position (as shown in FIG. 1) and a second, extended position (as shown in FIG. 9) respectively.

Referring to FIGS. 1,3,5,6 and 7, cross supports or members 40 extend between the side support members 14. In the illustrative embodiment shown, two cross members 40 are provided. The cross members 40 are positioned proximate to, but spaced from, the scaffold receiving members 16 of the side support members 14. The cross members 40 have a generally cylindrical configuration and are mounted in openings 42 (FIG. 6) of the side support members 14. The cross sectional circumference of the cross members 40 is essentially equal to, but slightly smaller than, the circumference of the openings 42. This allows the cross members 40 to be securely mounted in the openings 42, while allowing the cross members 40 to rotate as required. The cross members 40 maintain the positioning of the side support members 14 relative to each other. The cooperation of the side support members 14 and the cross members 40 provide the base 10 with a rigid and stable frame which provided stability to the scaffolding that is attached thereto.

Figure 6:
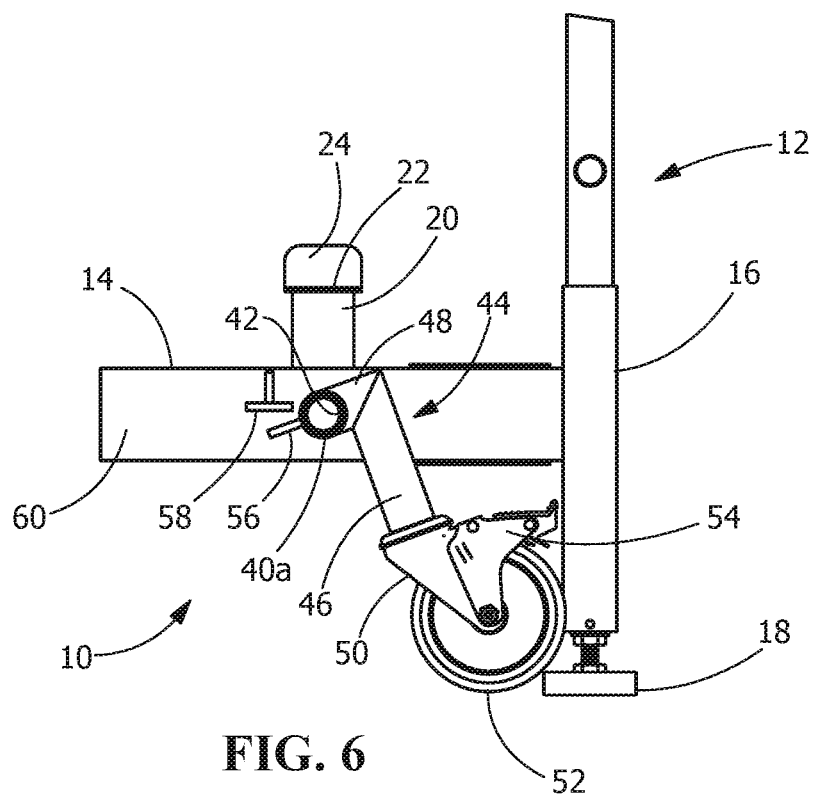
FIG. 6 is an enlarged view of the section indicated by the outline marked 6 in FIG. 1.

As shown in FIG. 6, wheel brackets 44 are mounted to and extend from the cross members 40. As shown in FIGS. 5 and 6, the wheel brackets 44 have wheel mounting arms 46 and offset arms 48. The offset arms 48 extend from the cross members 40, whereby longitudinal axes of the offset arms 48 are positioned essentially perpendicular to longitudinal axes of the cross members 40 regardless of the orientation of the cross members 40. The wheel mounting arms 46 extend from ends of the offset arms 48 which are spaced from the cross members 40. Longitudinal axes of the wheel mounting arms 46 are positioned essentially perpendicular to longitudinal axes of the offset arms 48 and are offset from the longitudinal axes of the cross members 40. Wheel mounts 50 with wheels 52 are positioned at the ends of the wheel mounting arms 46. Wheel locks 54 (FIG. 6) may be provided on the wheel mounts 50. The configuration of the wheel mounting arms 46 and the offset arms 48 allow the wheels 52 to be offset from the longitudinal axes of the cross members 40.

In the illustrative embodiment shown, four wheel brackets 44 and wheels 52 are provided. However, other numbers of wheel brackets 44 and wheels 52 may be provided.

As shown in FIG. 6, limiting projections 56 extend from the cross members 40 and are positioned proximate the side support members 14. The limiting projections 56 extend from the cross members 40 in essentially the opposite direction as the offset arms 46. The limiting projections 56 cooperate with limiting tabs 58. The limiting tabs 58 extend from the side support members 14, as is shown in FIG. 6. The limiting tabs 58 extend from inside surfaces 60 of the side support members 14. The configurations of the limiting projections 56 and the limiting tabs 58 may vary from that shown in the illustrative embodiment.

Figure 7:
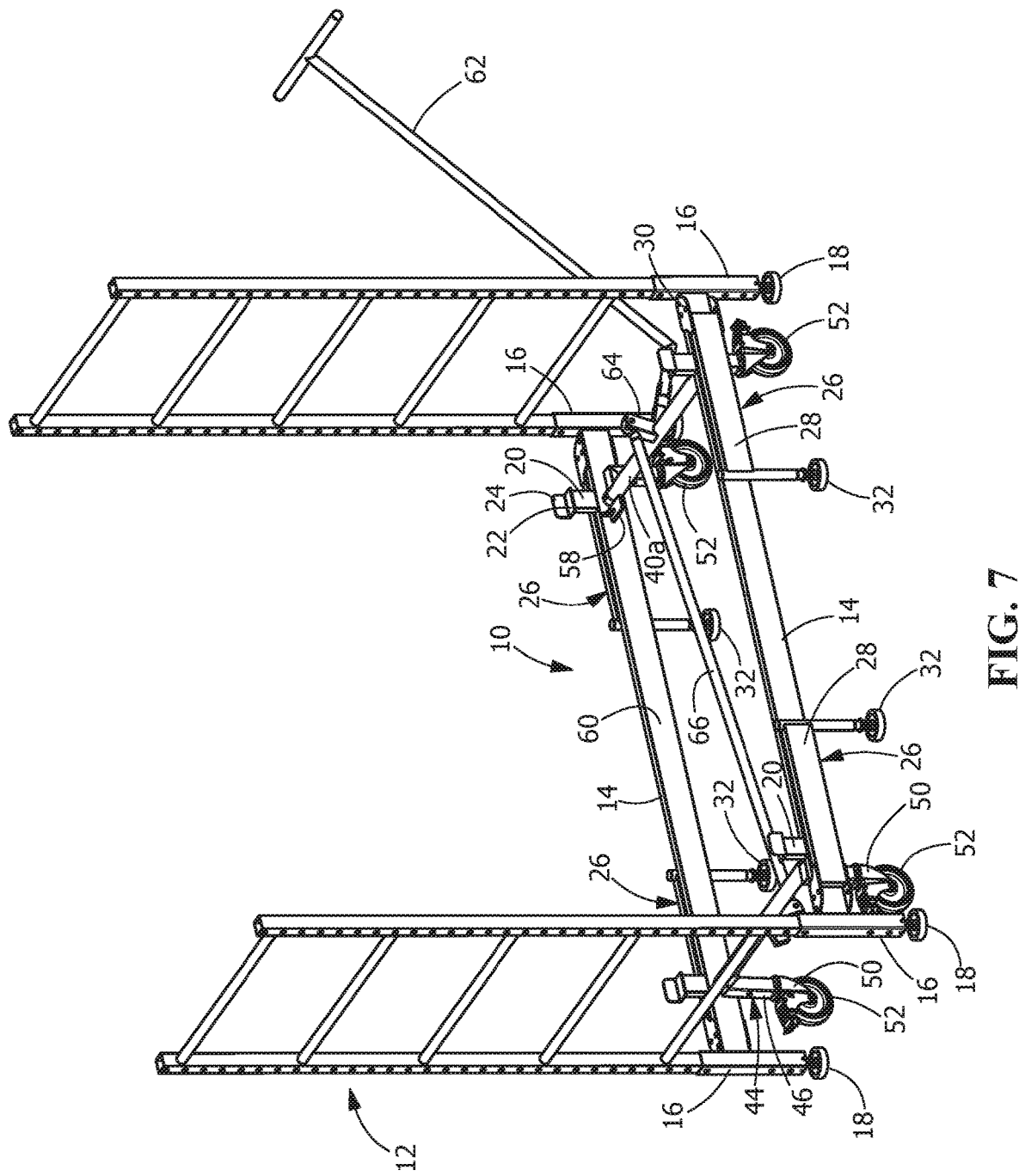
FIG. 7 is a perspective view of the illustrative embodiment of the scaffold base of the present invention with the scaffold base shown in a movable position, with the wheels in contact with the ground or floor surface.

As shown in FIGS. 1, 7 and 9, the offset arms 48 and the wheel brackets 44 of a first or front cross member 40a extend from the first cross member 40a in a opposite direction as the offset arms 48 and the wheel brackets 44 of a second or rear cross member 40b extend from the second cross member 40b. While first cross member is used to describe 40a and second cross member is used to describe 40b in the illustrative embodiment, this orientation is meant to be illustrative and not limiting. For example, 40a may be described as the second cross member and 40b may be described as the first cross member.

A handle or other type of engagement member 62 cooperates with the first cross member 40a, second cross member 40b, or both. The engagement member 62 extends from the cross member 40a in a direction away from the second cross member 40b. The engagement member 62 extends beyond respective scaffold receiving members 16. The engagement member 62 is attached to the first cross member 40a in such a manner that the movement of the engagement member 62 causes the first cross member 40a to rotate. In the illustrative embodiment shown, the engagement member 62 is mounted to the first cross member 40a at approximately the center of the first cross member 40 which is approximately equidistant between the two side support members 22.

A first activation or connecting shaft mounting bracket or member 64 is provided on the first cross member 40a. The first connecting shaft mounting bracket 64 is provided proximate to and in line with the engagement member 62. An activation or connecting shaft 66 extends from the first connecting shaft mounting bracket 64 in a direction toward the second cross member 40b. The connecting shaft 66 is mounted to the first connecting shaft mounting bracket 64 in a manner which allows the connecting shaft 66 to pivot relative to the first connecting shaft mounting bracket 64 as the first cross member 40a is rotated.

A second activation or connecting shaft mounting bracket or member 68 is provided on the second cross member 40b. The second connecting shaft mounting bracket 68 is provided in line with the first connecting shaft mounting bracket 64. The connecting shaft 66 extends from the second connecting shaft mounting bracket 68 in a direction toward the first cross member 40a. The connecting shaft 66 is mounted to the second connecting shaft mounting bracket 68 in a manner which allows the connecting shaft 66 to pivot relative to the second connecting shaft mounting bracket 68 as the first cross member 40a is rotated.

In the illustrative embodiment shown, the first connecting shaft mounting bracket 64 extends upward from the first cross member 40a and the second connecting shaft mounting bracket 68 extends downward from the second cross member 40b when the wheels 52 are spaced from the ground or floor surface, as shown in FIG. 1.

In use, scaffolding 12 is generally transported to a site and erected to provide a user the ability to reach areas not accessible without some type of height assistance. With the present invention, the pieces of the scaffold can be laid on the base 10 and transported to the appropriate position. In so doing, the pieces of the scaffolding can be laid or stacked on the riser members 20 for transporting to appropriate location. The piece of scaffolding are supported by the flat surface 22 of the riser members 20 and are maintained on the flat surfaces 22 by the retention projections 24. With the base 10 properly loaded, the engagement member 62 is moved, causing the wheels 52 to engage the ground or floor surface, thereby allowing the base 10 and the scaffolding 12 to be moved to the proper location. The movement of the wheels will be more fully discussed below.

With the base 10 and scaffolding 12 properly located, the scaffolding can be erected by placing pieces of the scaffolding 12 in the scaffolding receiving members 16, as shown in FIG. 1, and building the scaffold using known techniques. Alternatively, the scaffolding 12 can first be erected and transported to the proper location by use of the base 10.

With a user standing or climbing on the scaffold 12, the scaffold 12 must be in a stable, not movable position to ensure the safety of the user. As shown in FIGS. 1 through 4 of the present invention, in this initial, the handle or engagement member 62 is not engaged. Consequently, the wheel brackets 44 are positioned such that the wheels 52 do not engage the ground or floor surface.

In this position, the feet 18 which extend from the ends of the scaffold receiving members 16 are in contact with the ground or floor surface to provide stability to the base 10 and the scaffold 12. With the feet in engagement with the ground or floor surface, the base 10 and the scaffold 12 are not easily moveable.

Figure 10:
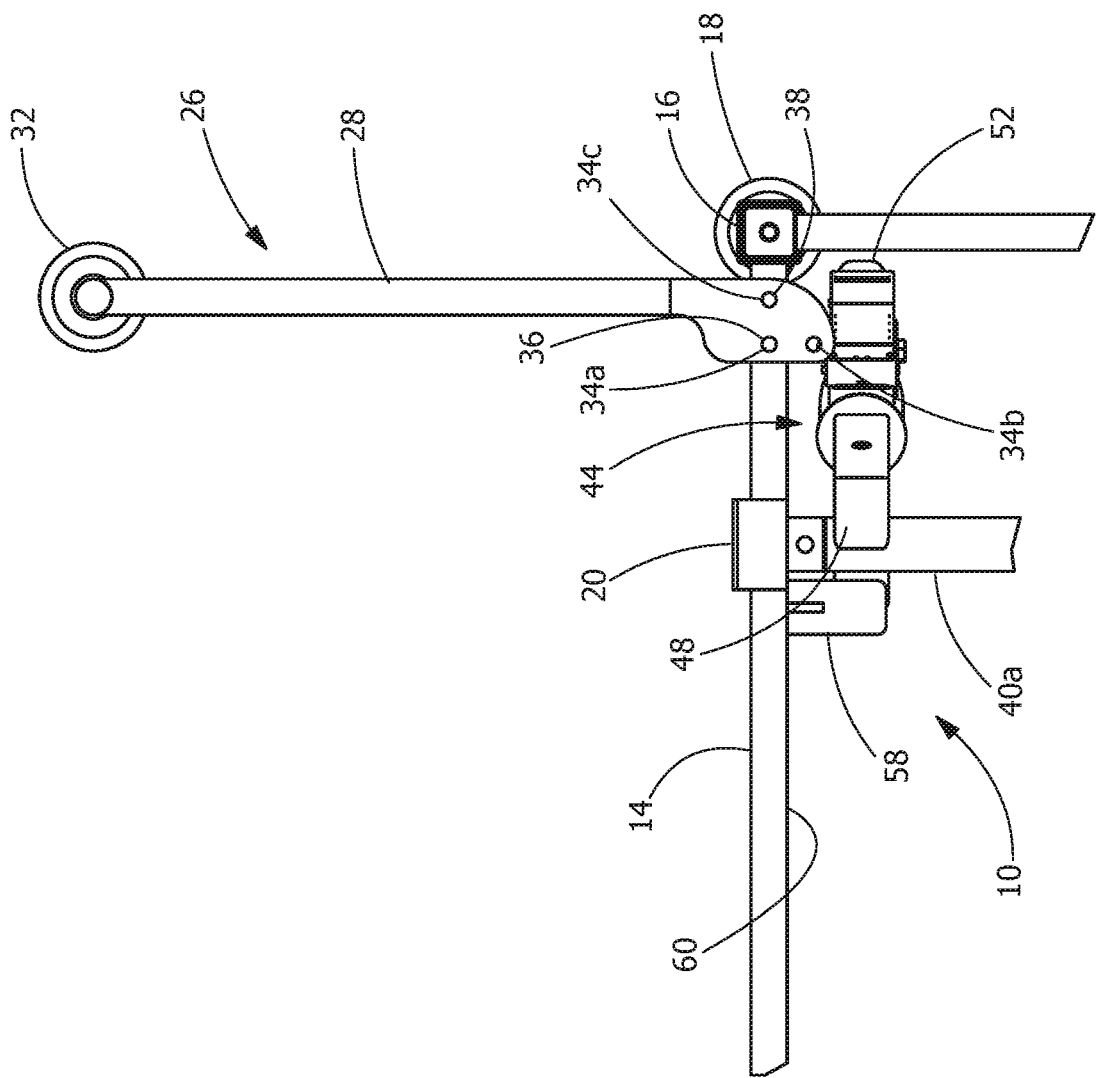
FIG. 10 is an enlarged view of the section indicated by the outline marked 10 in FIG. 9.

To increase the stability of the base 10 and scaffold 12, the movable supports or outriggers 26 can be moved from the their initial position, as shown in FIG. 1, to the extended position, as shown in FIGS. 9 and 10. In order to allow the outriggers 26 to be moved, mechanical fasteners 38 are removed from openings 34b, thereby allowing the extension arms 28 and adjustable feet 32 to rotate about mechanical fasteners 36 positioned in openings 34a. Rotation continues until openings 34c are aligned with second openings in the side support members 14. When aligned, mechanical fasteners 38 are positioned through openings 34c and the second openings to retain the outriggers 26 in the extended position. In this position, the extension arms 28 extends at approximately 90 degrees from the side support members 14. This allows the feet 32 to be spaced from the feet 18 to provide additional stability to the base 10 and the scaffold 12 when the outriggers 26 are in the extended position.

In various embodiments, additional weight or ballast may be provided on the base 10. The additional weight provides additional forces to the feet 18, 32 to better stabilize the base 10 and scaffold 12 on the ground or floor surface.

Figure 8:
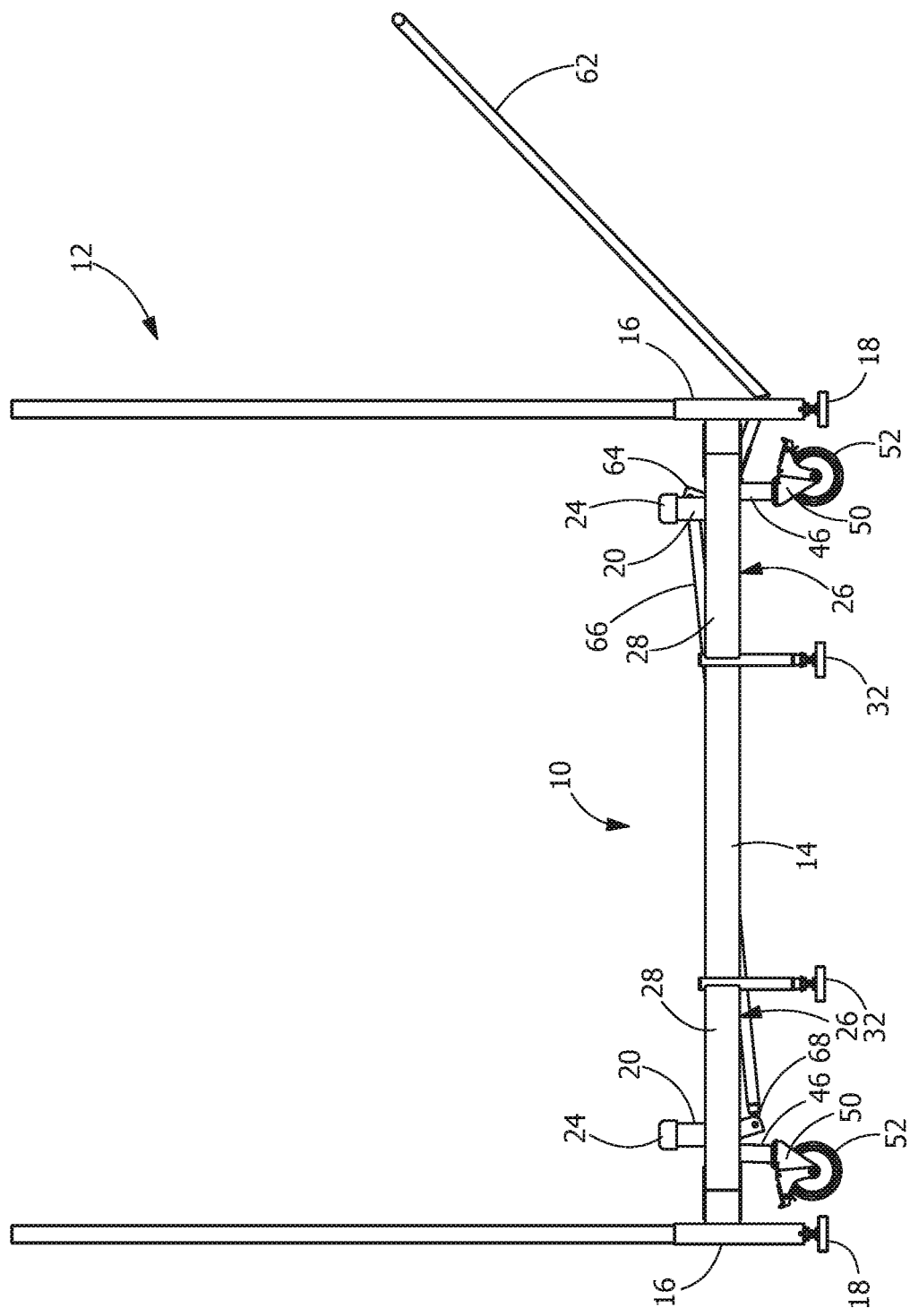
FIG. 8 is a side view of the scaffold base and the scaffold of FIG. 7 with the wheels shown in the extended position and outriggers shown in an initial or non-extended position.

In various applications, the base 10 and scaffold 12 must be moved as the user must be able to access different areas. In order to move the base 10, the user engages the engagement member 62 and moves the engagement member 62 downward to the position shown in FIGS. 7 and 8. As the engagement member 62 is moved, the engagement member 62 causes the front cross member 40a to rotate in a clockwise direction. The rotation of the front cross member 40a causes the wheel brackets 44 and the wheels 52 to also be rotated in a clockwise direction. As rotation continues, the wheels 52 engage the ground or floor surface, causing the base 10 to be lifted, which in turn causes the feet 18, 32 to be lifted from the ground or floor surface.

As the front cross member 40a is rotated, the first activation or connecting shaft mounting bracket 64 is also rotated in the clockwise direction. This causes that activation or connecting shaft 66 to move toward the front of the base 10. The movement of the activation or connecting shaft 66 caused the second activation or connecting shaft mounting bracket 68 to move. As the first activation or connecting shaft mounting bracket 64 is mounted to the top of the front cross member 40a and the second activation or connecting shaft mounting bracket 68 is mounted to the bottom of the second cross member 40b, the movement of the second activation or connecting shaft mounting bracket 68 causes the second cross member 40b to be rotated in the counter clockwise direction.

The rotation of the second cross member 40b causes the wheel brackets 44 and the wheels 52 to also be rotated in the counter clockwise direction. As rotation continues, the wheels 52 engage the ground or floor surface, causing the base 10 to be lifted, which in turn causes the feet 18, 32 to be lifted from the ground or floor surface.

Rotation of the cross members 40 is limited by the cooperation of the limiting projections 56 of the cross members 40 and the limiting tabs 58 of the side support members 14. As the cross members 40 are rotated, the limiting projections 56 will engage the limiting tabs 58 to prevent further rotation. With the limiting projections 56 in engagement with the limiting tabs 58 the longitudinal axes of the wheel mounting arms 46 of the wheel brackets 44 will be approximately perpendicular to the plane of the ground or floor surface, thereby properly positioning the wheels 52 in position to lift the base 10.

With all wheels 52 in engagement with the ground or floor surface, all of the feet 18, 32 of the base 10 are spaced from the ground or floor surface. This allows the base 10 and scaffold 12 to be moved as needed.

As previously stated, the offset arms 48 of the wheel brackets 44 and the wheels 52 are offset from the axes of the cross members 40. Therefore, as the user releases the handle or engagement member 62, the wheels 52 and the cross members 40 are rotated back to their initial position shown in FIG. 1. The offset of the wheels 52 from the axes of the cross members 40 allows the wheels 52 to be rotated back by gravity pulling on the base 10 when no force is applied to the handle or engagement member 62. This provides a failsafe method of braking, securing and stabilizing the base 10 and scaffold 12, preventing the unwanted movement of the base 10 and scaffold 12.

Although the illustrative embodiments of the base 10 is used with scaffolding 12, the base 10 as described herein can be used with many different types of movable structures. Therefore, the use of the base 10 is not meant to be limited to the illustrative embodiments shown and described.

The base 10 provides a failsafe method of preventing the unwanted movement of the scaffold 12 or other structure. Unless the handle or engagement member 62 of the base 10 is moved downward, the base 10 is maintained in an unmovable position, with the feet 18, 32 in contact with the ground or floor surface. In addition, during the moving operation, if the user loses or relinquishes engagement with the handle or engagement member 62, the handle or engagement member 62 is disengaged causing the wheels 52 to be moved away from the ground or floor surface, preventing further movement of the base 10 and the scaffold 12. Consequently, the uncontrolled movement of the base 10 and the scaffold 12 is prevented.

The base 10 provides for a stable base of the scaffold 12 or other movable structure. The base 10 also provides a failsafe method of preventing the unwanted movement of the base 10, scaffold 12 or other movable structure. Unless the handle or engagement member 62 of the base 10 is moved downward, the base 10 is maintained in an unmovable position.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A base for use with scaffolding, the base comprising:
   side support members having scaffold receiving members provided at ends thereof;
   cross members extending between the side support members, the cross members having a first cross member and a second cross member, the second cross member being spaced from the first cross member;
   first wheels mounted to the first cross member and second wheels mounted to the second cross member;
   an engagement member extending from the first cross member of the cross members in a direction away from the second cross member, the engagement member being attached to the first cross member wherein the movement of the engagement member causes the first cross member to rotate;
   a connecting shaft extending between the first cross member and the second cross member, the connecting shaft being pivotally mounted to the first cross member and the second cross member;
   wherein as the engagement member is engaged, the first cross member is rotated in a first direction and the second cross member is rotated in a second direction, the first direction being opposed to the second direction, the first wheels are rotated in the first direction and the second wheels are rotated in the second direction from an initial position in which the first wheels and the second wheels are spaced from a ground or floor surface to a second position in which the first wheels and the second wheels are positioned in engagement with the ground or floor surface.

2. The base as recited in claim 1, wherein a first connecting shaft mounting bracket is provided on the first cross member, the first connecting shaft mounting bracket is provided proximate to and in line with the engagement member, the connecting shaft extends from the first connecting shaft mounting bracket in a direction toward the second cross member, the connecting shaft is pivotally mounted to the first connecting shaft mounting bracket.

3. The base as recited in claim 2, wherein a second connecting shaft mounting bracket is provided on the second cross member, the second connecting shaft mounting bracket is provided in line with the first connecting shaft mounting bracket, the connecting shaft extends from the second connecting shaft mounting bracket in a direction toward the first cross member, the connecting shaft is pivotally mounted to the second connecting shaft mounting bracket.

4. The base as recited in claim 3, wherein the first connecting shaft mounting bracket extends upward from the first cross member and the second connecting shaft mounting bracket extends downward from the second cross member when the wheels are spaced from the ground or floor surface.

5. The base as recited in claim 1, wherein the cross members have cylindrical configurations and are mounted in openings of the side support members.

6. The base as recited in claim 5, wherein cross sectional circumferences of the cross members are essentially equal to, but smaller than, circumferences of the openings, wherein the cross members are securely mounted in the openings, while allowing the cross members to rotate relative to the side support members.

7. The base as recited in claim 6, wherein wheel brackets are mounted to and extend from the cross members.

8. The base as recited in claim 7, wherein the wheel brackets have wheel mounting arms and offset arms, the offset arms extend from the cross members, longitudinal axes of the offset arms are positioned essentially perpendicular to longitudinal axes of the cross members regardless of the orientation of the cross members, the wheel mounting arms extend from ends of the offset arms which are spaced from the cross members, longitudinal axes of the wheel mounting arms are positioned essentially perpendicular to the longitudinal axes of the offset arms and are offset from the longitudinal axes of the cross members.

9. The base as recited in claim 8, wherein the first wheels and the second wheels are positioned at the ends of the wheel mounting arms, the first wheels and the second wheels are offset from the longitudinal axes of the cross members.

10. The base as recited in claim 8, wherein limiting projections extend from the cross members and are positioned proximate the side support members, the limiting projections extend from the cross members in the opposite direction as the offset arms.

11. The base as recited in claim 10, wherein the limiting projections cooperate with limiting tabs, the limiting tabs extend from inside surfaces of the side support members.

12. The base as recited in claim 8, wherein the offset arms and the wheel brackets of the first cross member of the cross members extend from the first cross member in a opposite direction as the offset arms and the wheel brackets of the second cross member extend from the second cross member.

13. The base as recited in claim 1, wherein the side support members have outriggers movably attached thereto.

14. The base as recited in claim 13, wherein the outriggers have extension arms which have support member connections at one end and adjustable feet provided at the opposite end.

15. The base as recited in claim 14, wherein the outriggers pivot about the side support members between a retracted position and an extended position.

16. The base as recited in claim 1, wherein riser members extend from the side support members, the riser members are spaced along upper surfaces of the side support members, the riser members extend from the upper surfaces in a direction away from lower surfaces of the side support members.

17. The base as recited in claim 16, wherein the riser members have flat end surfaces which extend essentially parallel to the upper surfaces of the side support members, retention projections extend from the end surfaces, the retention projections extend essentially perpendicular to the end surfaces.

18. The base as recited in claim 1, wherein adjustable feet are provided at the ends of the scaffold receiving members.

19. The base as recited in claim 1, wherein the cross members are positioned proximate to, but spaced from, the scaffold receiving members of the side support members.

* * * * *